United States Patent
Kirchner et al.

(10) Patent No.: US 10,823,206 B2
(45) Date of Patent: Nov. 3, 2020

(54) VENT LIMITING DEVICE FOR USE WITH FLUID REGULATORS

(71) Applicant: EMERSON PROCESS MANAGEMENT REGULATOR TECHNOLOGIES, INC., McKinney, TX (US)

(72) Inventors: Bret M. Kirchner, Dallas, TX (US); Hoden Ali Farah, Plano, TX (US); Aaron J. Dowdell, Princeton, TX (US); Christopher Sequeira, Addison, TX (US); David F. Graft, Flower Mound, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 0 days.

(21) Appl. No.: 16/050,901

(22) Filed: Jul. 31, 2018

(65) Prior Publication Data

US 2020/0040919 A1  Feb. 6, 2020

(51) Int. Cl.
*F15B 21/044* (2019.01)
*F15B 20/00* (2006.01)
(Continued)

(52) U.S. Cl.
CPC .......... *F15B 21/044* (2013.01); *F15B 20/008* (2013.01); *F16K 17/30* (2013.01);
(Continued)

(58) Field of Classification Search
CPC ............... F15B 21/044; F15B 20/008; F15B 2211/8752; Y10T 137/7794;
(Continued)

(56) References Cited

U.S. PATENT DOCUMENTS 2,302,284 A * 11/1942 Abbott ............... G05D 16/0661
137/526
2,347,586 A *  4/1944 Whitworth ............ F16K 17/168
137/507
(Continued)

FOREIGN PATENT DOCUMENTS

EP          0678178 A1    10/1995
WO    WO-2006/125270 A1  11/2006

OTHER PUBLICATIONS

Pietro Fiorentini, "Governor Line Pressure Regulators", https://www.fiorentini.com/us/en/product/components/gasinside, Nov. 2014.
(Continued)

*Primary Examiner* — William M Mccalister
(74) *Attorney, Agent, or Firm* — Marshall, Gerstein & Borun LLP

(57) ABSTRACT

A vent limiting device adapted to be operably coupled to an exhaust vent of a fluid regulator. The vent limiting device includes a housing, a poppet disposed in the housing, and a retaining element arranged to retain the poppet in the housing. The housing has a fluid passageway extending between a fluid inlet and a fluid outlet. The poppet is movably disposed in the housing, responsive to pressure at the fluid outlet, to control fluid flow through the fluid passageway. The housing includes one or more retaining features that engage the retaining element to retain the retaining element in the housing.

20 Claims, 5 Drawing Sheets

(51) Int. Cl.
    *G05D 16/06* (2006.01)
    *G05D 7/01* (2006.01)
    *F16K 17/30* (2006.01)
(52) U.S. Cl.
    CPC ....... *G05D 7/0106* (2013.01); *G05D 16/0683* (2013.01); *F15B 2211/8752* (2013.01)
(58) Field of Classification Search
    CPC ......... Y10T 137/7835; Y10T 137/7937; Y10T 137/7938; Y10T 137/7939; G05D 16/0683; G05D 7/0106; F16K 17/30
    USPC .... 137/505.11, 509, 543.19, 543.21, 543.23, 137/498
    See application file for complete search history.

(56) References Cited

U.S. PATENT DOCUMENTS

| | | | | |
|---|---|---|---|---|
| 2,591,060 A | | 4/1952 | Garretson | |
| 2,668,555 A | * | 2/1954 | Bartolat | F16K 17/30 137/498 |
| 2,699,799 A | * | 1/1955 | Wager | F22B 37/545 137/498 |
| 2,747,597 A | * | 5/1956 | Keckler | B64D 37/20 137/107 |
| 2,752,212 A | * | 6/1956 | Hedges | F16J 1/08 92/159 |
| 2,819,728 A | * | 1/1958 | Gage | G05D 7/0106 137/505.39 |
| 2,845,086 A | * | 7/1958 | Waterman | G05D 7/0133 137/504 |
| 2,851,564 A | * | 9/1958 | Zimmerman | F16K 17/105 200/830 |
| 2,865,397 A | * | 12/1958 | Chenault | F15B 13/0417 137/504 |
| 2,867,234 A | * | 1/1959 | Billington | F16K 31/365 137/505.11 |
| 3,103,950 A | * | 9/1963 | Gulick | G05D 7/0133 137/494 |
| 3,122,162 A | * | 2/1964 | Sands | F16K 17/30 137/498 |
| 3,160,169 A | * | 12/1964 | Peterson | G05D 16/0683 137/315.42 |
| 3,211,175 A | * | 10/1965 | Replogle | A62B 9/02 137/493 |
| 3,331,389 A | * | 7/1967 | Kirk | F16K 17/30 137/516.11 |
| 3,359,960 A | * | 12/1967 | Pittsley | F01M 13/023 123/574 |
| 3,379,213 A | * | 4/1968 | Billington | F16K 15/063 137/515.5 |
| 3,412,650 A | | 11/1968 | Stang | |
| 3,439,703 A | * | 4/1969 | Toda | F01M 13/023 137/480 |
| 3,469,605 A | | 9/1969 | Courtot | |
| 3,496,962 A | * | 2/1970 | Tuzson | F15B 13/02 137/504 |
| 3,503,417 A | * | 3/1970 | Toda | F01M 13/023 137/480 |
| 3,521,661 A | * | 7/1970 | Hollcroft et al. | F04D 27/0215 137/220 |
| 3,630,228 A | * | 12/1971 | Turner | F16K 15/026 137/614.18 |
| 3,661,175 A | | 5/1972 | Tillman | |
| 3,705,599 A | * | 12/1972 | Sheward | G05D 16/0688 137/116.5 |
| 3,735,777 A | * | 5/1973 | Katzer | F16K 17/34 137/514.5 |
| 3,741,242 A | * | 6/1973 | Hansen | F16K 17/0433 137/504 |
| 3,766,898 A | * | 10/1973 | McMullen | F01M 13/023 123/574 |
| 3,877,489 A | * | 4/1975 | Louie | F16K 17/34 138/46 |
| 3,910,306 A | | 10/1975 | Ohrn | |
| 4,022,113 A | | 5/1977 | Blatt | |
| 4,080,993 A | * | 3/1978 | Lind, Jr. | G05D 7/014 137/504 |
| 4,129,144 A | * | 12/1978 | Andersson | F16K 15/026 137/516.29 |
| 4,174,731 A | | 11/1979 | Sturgis et al. | |
| 4,195,656 A | * | 4/1980 | Kanerva | G05D 16/0688 137/458 |
| 4,456,029 A | | 6/1984 | McCrum | |
| 4,590,962 A | * | 5/1986 | Tespa | F16K 17/30 137/460 |
| 4,605,039 A | * | 8/1986 | Johnson | F16K 17/30 137/460 |
| 4,625,703 A | * | 12/1986 | Otto | F02M 25/06 123/572 |
| 4,958,657 A | * | 9/1990 | Hagan | F16K 17/30 137/513.5 |
| 5,004,008 A | * | 4/1991 | Drucker | F25B 41/06 137/493.2 |
| 5,135,023 A | * | 8/1992 | Ross | F17C 13/025 137/505.11 |
| 5,293,898 A | * | 3/1994 | Masloff | F16K 17/30 137/517 |
| 5,462,081 A | * | 10/1995 | Perusek | F16K 17/30 137/498 |
| 5,546,981 A | * | 8/1996 | Li | F16K 15/028 137/493.3 |
| 6,019,125 A | * | 2/2000 | Reverberi | F04B 53/1027 137/454.6 |
| 6,179,589 B1 | * | 1/2001 | Bass | F04C 23/008 137/543.19 |
| 6,244,295 B1 | * | 6/2001 | Bartussek | B60T 8/341 137/539 |
| 6,408,870 B1 | * | 6/2002 | Dulin | F16K 17/30 137/462 |
| 6,443,180 B1 | * | 9/2002 | Samuelson | F16K 17/30 137/460 |
| 6,892,757 B2 | * | 5/2005 | Weber | F16K 17/30 137/498 |
| 6,971,406 B2 | * | 12/2005 | Takahashi | F16K 15/026 137/538 |
| 7,258,131 B2 | * | 8/2007 | Eichler | F16K 17/30 137/460 |
| 7,353,834 B2 | * | 4/2008 | Childers | G05D 16/0686 137/14 |
| 7,441,561 B2 | * | 10/2008 | Montipo | F04B 53/1032 137/543.19 |
| 7,591,282 B1 | * | 9/2009 | Achterman | F16K 17/30 137/460 |
| 7,644,726 B1 | * | 1/2010 | Achterman | F16K 1/12 137/498 |
| 8,028,926 B2 | | 10/2011 | Heldberg | F16K 31/002 137/543.21 |
| 8,096,319 B2 | * | 1/2012 | Beck | F16K 15/046 137/543.19 |
| 8,151,822 B2 | * | 4/2012 | Kranz | F16K 17/32 137/505.12 |
| 8,156,958 B2 | * | 4/2012 | Zhang | G05D 16/0683 137/269 |
| 8,240,327 B2 | * | 8/2012 | Hawkins | G05D 16/0694 137/489.5 |
| 8,256,446 B2 | * | 9/2012 | Hawkins | F16K 31/165 137/116.5 |
| 8,256,452 B2 | * | 9/2012 | Hawkins | G05D 16/0688 137/505.46 |
| 8,281,803 B2 | * | 10/2012 | Mevius | F16K 31/165 137/484.8 |
| 8,336,574 B2 | * | 12/2012 | Kranz | G05D 16/0683 137/484.8 |
| 8,500,092 B2 | * | 8/2013 | Quijano | F16K 25/00 251/333 |
| 9,085,999 B2 | * | 7/2015 | Fujiki | F01M 13/0011 |
| 9,133,947 B2 | * | 9/2015 | Oh | F16K 17/34 |

(56) References Cited

U.S. PATENT DOCUMENTS

| | | | |
|---|---|---|---|
| 9,250,631 B2* | 2/2016 | Becker | G05D 7/0133 |
| 9,255,590 B2* | 2/2016 | Schuller | F15B 21/044 |
| 9,278,641 B2* | 3/2016 | Do Van | B60P 7/065 |
| 9,310,811 B2* | 4/2016 | Zhou | G05D 16/0688 |
| 9,486,884 B2* | 11/2016 | Dominguez | B23P 15/001 |
| 2004/0040600 A1* | 3/2004 | Cavagna | F16K 17/30 |
| | | | 137/505.11 |
| 2004/0187930 A1* | 9/2004 | Hawkins | G05D 16/0686 |
| | | | 137/505.47 |
| 2004/0221893 A1* | 11/2004 | Johnson | F16K 17/34 |
| | | | 137/498 |
| 2005/0092368 A1 | 5/2005 | Tahir et al. | |
| 2005/0268967 A1* | 12/2005 | Avis | F16K 17/30 |
| | | | 137/462 |
| 2008/0178946 A1* | 7/2008 | Lea-Wilson | F16K 17/30 |
| | | | 137/460 |
| 2011/0284104 A1* | 11/2011 | Riano Gutierrez | G05D 7/0133 |
| | | | 137/517 |
| 2012/0048403 A1 | 3/2012 | Chappel et al. | |
| 2014/0097374 A1* | 4/2014 | Moon | F16K 17/28 |
| | | | 251/359 |
| 2018/0335158 A1 | 11/2018 | Farah et al. | |

OTHER PUBLICATIONS

Emerson Process Management, "Type CS400EN with External Pressure Registration", Dec. 2008.

Maxitrol Company, "Vent Limiter," http://www.maxitrol.com/ventlimiting.html, publicly available as of Jul. 2018.

International Search Report and Written Opinion issued in connection with International Application No. PCT/US2018/030165, dated Jul. 20, 2018.

Gas Pressure Regulators Catalog, Maxitrol Company, 2013, 6 pages.

VLimiter® Vent Limiting Device Maximum Allowable Venting Rate, 1 page.

Office Action issued in connection with U.S. Appl. No. 15/597,525, dated Feb. 6, 2019.

International Search Report received for Application No. PCT/US2019/043142, dated Oct. 15, 2019.

Written Opinion received for Application No. PCT/US2019/043142, dated Oct. 15, 2019.

Maxitrol Company, "Accessories for Gas Pressure Regulators," http://www.controltrends.org/wp-content/uploads/2010/10/Maxitrol-accessories.pdf. Oct. 2019.

* cited by examiner

VENT LIMITING DEVICE FOR USE WITH FLUID REGULATORS

FIELD OF THE DISCLOSURE

The present disclosure is generally directed to fluid regulators and, more particularly, to a vent limiting device for use with fluid regulators.

BACKGROUND

Conventionally, fluid regulators include an actuator that responds to a pressure of a process fluid. These actuators typically include a diaphragm disposed within a spring case or casing, and the casing includes a vent hole that facilitates the movement of air into and out of the casing as the diaphragm of the fluid regulator moves in response to pressure changes in the process fluid. The vent hole thus serves to maintain the pressure on one side of the diaphragm at atmospheric pressure.

When the fluid regulator is installed in an internal environment (e.g., in a residential building), vent piping is typically fluidly coupled to the vent hole. The vent piping runs to an ambient or external environment, such as outside or another safe location. In the event that a diaphragm or some other component of the fluid regulator fails, the vent piping can vent process gas from within the fluid regulator to the external environment, such that the process gas is not vented into or within the internal environment, creating a fire hazard, and/or does not damage the fluid regulator. However, installing and maintaining vent piping can be costly and require significant amounts of time, and vent piping, once installed, can take up significant amounts of space.

BRIEF SUMMARY

One aspect of the present disclosure is directed to a vent limiting device adapted to be operably coupled to an exhaust vent of a fluid regulator. The vent limiting device includes a housing, a poppet, and a retaining element. The housing has a fluid inlet, a fluid outlet, and a fluid passageway extending between the fluid inlet and the fluid outlet, the housing including a seat disposed along the fluid passageway. The poppet is disposed in the housing and is movable relative to the seat, responsive to pressure at the fluid inlet, to control fluid flow through the fluid passageway. The poppet is movable between an open position, in which the poppet is spaced from the seat, thereby allowing fluid flow through the fluid passageway, and a closed position, in which the poppet sealingly engages the seat, thereby preventing fluid flow through the fluid passageway. The retaining element is arranged to retain the poppet in the housing. The housing includes a plurality of projections that engage the retaining element to retain the retaining element in the housing and that define a plurality of grooves that form a portion of the fluid passageway between the housing and the retaining element.

Another aspect of the present disclosure is directed to a vent limiting device adapted to be operably coupled to an exhaust vent of a fluid regulator. The vent limiting device includes a housing, a poppet, and a retaining element. The housing has a fluid inlet, a fluid outlet, and a fluid passageway extending between the fluid inlet and the fluid outlet, the housing including a seat disposed along the fluid passageway. The poppet is disposed in the housing and is movable relative to the seat, responsive to pressure changes at the fluid inlet, to control fluid flow through the fluid passageway. The poppet includes a substantially flat disc and is movable between an open position, in which the poppet is spaced from the seat, thereby allowing fluid flow through the fluid passageway, and a closed position, in which the poppet sealingly engages the seat, thereby preventing fluid flow through the fluid passageway. The retaining element is arranged to retain the poppet in the housing.

Another aspect of the present disclosure is directed to a fluid regulator. The fluid regulator includes a regulator body defining a regulator fluid inlet, a regulator fluid outlet, and a regulator flow passageway extending therebetween, a control element configured to control a fluid flow through the regulator body, and an actuator operatively coupled to the control element and configured to control a position of the control element. The actuator includes an actuator housing, a diaphragm disposed within the actuator housing and movable within the actuator housing in response to pressure changes at the regulator fluid inlet or the regulator fluid outlet, a first chamber defined adjacent a first side of the diaphragm, a second chamber defined adjacent a second side of the diaphragm, and an exhaust vent formed in the actuator housing to fluidly couple the second chamber to the atmosphere. The fluid regulator further includes a vent limiting device coupled to the exhaust vent. The vent limiting device includes a housing, a poppet, and a retaining element. The housing has a fluid inlet, a fluid outlet, and a fluid passageway extending between the fluid inlet and the fluid outlet, the housing including a seat disposed along the fluid passageway. The poppet is disposed in the housing and is movable relative to the seat, responsive to pressure changes at the fluid inlet, to control fluid flow through the fluid passageway. The poppet is movable between an open position, in which the poppet is spaced from the seat, thereby allowing fluid flow through the fluid passageway, and a closed position, in which the poppet sealingly engages the seat, thereby preventing fluid flow through the fluid passageway. The retaining element is arranged to retain the poppet in the housing, wherein the housing includes one or more retaining features that engage the retaining element to retain the retaining element in the housing and that define a portion of the fluid passageway between the housing and the retaining element.

Any of the above aspects of the disclosure may include any one or more of the following preferred forms.

In one preferred form, the poppet is seated against the retaining element.

In another preferred form, the housing is made of metal and the poppet is made of metal, thereby creating a metal-to-metal seal when the poppet is in the closed position.

In another preferred form, the vent limiting device further includes a spring having one end seated against the poppet and another end seated against a spring seat defined by the housing. The spring is configured to bias the poppet to the open position.

In another preferred form, the retaining element includes a retaining ring and the poppet covers a central portion of the retaining ring in the open position.

In another preferred form, the plurality of projections extend radially inwardly.

In another preferred form, the fluid outlet is defined by one or more vent holes formed in the housing, further comprising one or more barriers disposed in each of the vent holes. The barriers may be removably disposed in each of the vent holes.

In another preferred form, the vent limiting device further includes a plurality of threads formed on an external surface of the housing, the plurality of threads spaced between a first end of the housing and a second end of the housing. The plurality of threads do not extend to either the first or second end of the housing.

In another preferred form, the retaining element is disposed entirely within the housing.

In another preferred form, the housing includes a plurality of projections that engage the retaining element to retain the retaining element in the poppet.

Additional optional aspects, arrangements, examples, and features are disclosed, which may be arranged in any functionally appropriate manner, either alone or in any functionally viable combination, consistent with the teachings of the disclosure. Other aspects and advantages will become apparent upon consideration of the following detailed description.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION OF THE DRAWINGS

The present disclosure is directed to a vent limiting device for use with fluid regulators, and a fluid regulator employing such a vent limiting device. The vent limiting device is generally configured to maintain the pressure within a chamber of a fluid regulator at atmospheric pressure while also limiting, if not totally preventing, the flow of process fluid out of the fluid regulator in the event that a component of the fluid regulator fails. In doing so, the vent limiting device obviates the need for external vent piping, which is normally coupled to the exhaust vent and which can be costly and time-consuming to install and maintain and can require significant amounts of space once installed.

Figure 1:
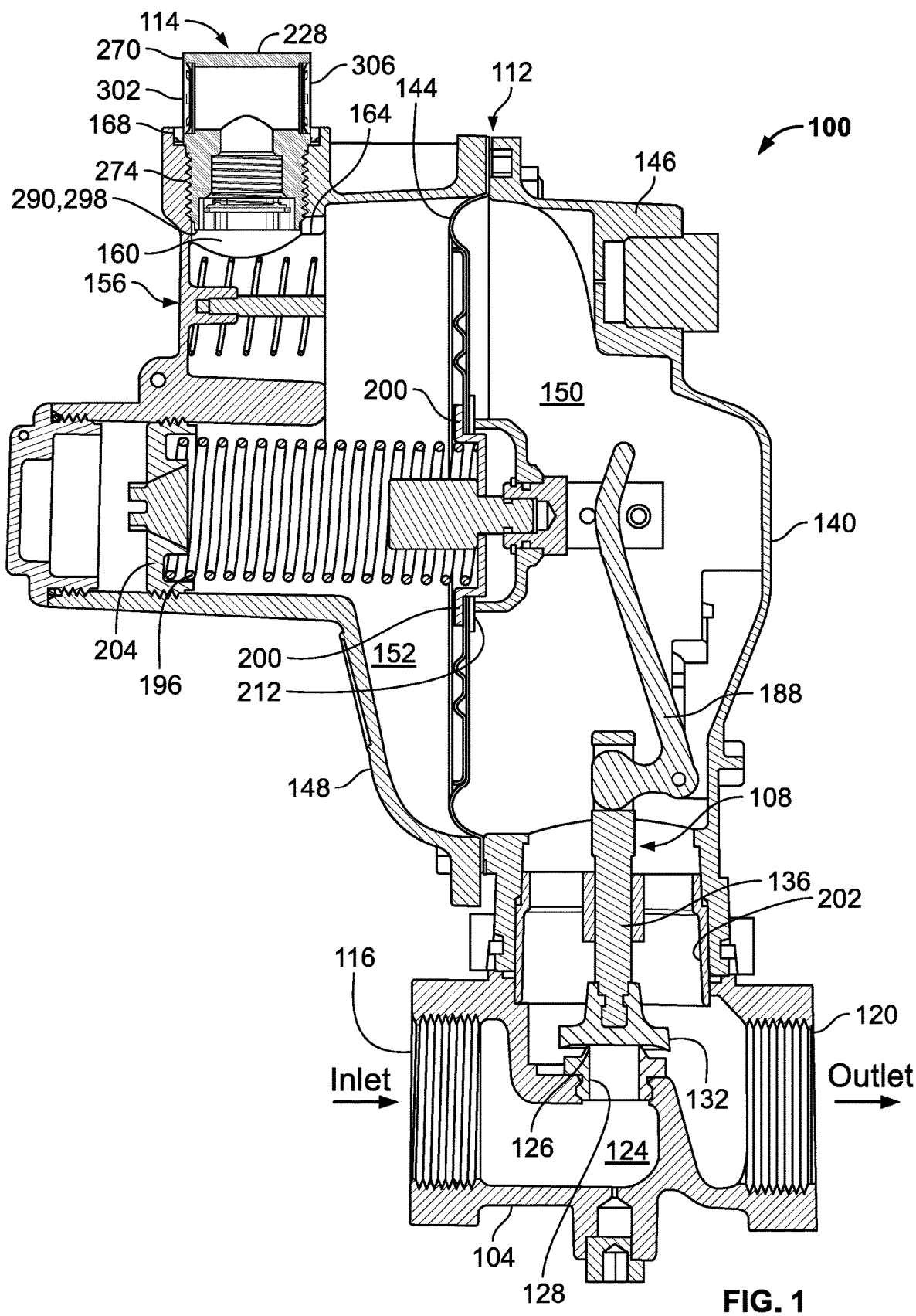
FIG. 1 is a cross-sectional view of a control valve assembly employing a vent limiting device that is constructed in accordance with the teachings of the present disclosure.

FIG. 1 depicts one example of a control valve assembly 100 constructed in accordance with the present disclosure. The control valve assembly 100 described herein is installed within, at, or in an internal environment (e.g., in a residential building), but it need not be. For example, the control valve assembly 100 can be installed in an external environment (e.g., outdoors). In this example, the control valve assembly 100 is a process fluid regulator that includes a regulator body 104, a control element 108, an actuator assembly 112, and a vent limiting device 114. In other examples, the control valve assembly 100 can be a different type of process control device, a different type of process fluid regulator, and/or include different and/or additional components.

The regulator body 104 defines a fluid inlet 116, a fluid outlet 120, and a fluid flow path 124. The fluid flow path 124 extends between the fluid inlet 116 and the fluid outlet 120 when the control valve assembly 100 is in an open position. An orifice 128 is disposed in the regulator body 104 and defines a valve seat 126 disposed between the fluid inlet 116 and the fluid outlet 120. The control element 108 is disposed for displacement in the regulator body 104, relative to the valve seat 126, for controlling the flow of fluid therethrough (as described below). The control element 108 includes a valve plug or valve disk 132 connected to a valve stem 136. When the control valve assembly 100 is in a closed position, as depicted in FIG. 1, the valve plug 132 is positioned against the valve seat 126 thus blocking the flow of process fluid along the flow path 124 (i.e., preventing fluid at the inlet 116 from flowing to the outlet 120).

The actuator assembly 112 is operatively connected to the regulator body 104 to control the position of the control element 108 relative to the valve seat 126. The actuator assembly 112 includes a housing 140, a diaphragm 144 disposed within the housing 140, and a linkage operatively connecting the diaphragm 144 to the control element 108. The actuator housing 140 is formed of a first or diaphragm case 146 and a second or spring case 148 secured together, such as with one or more bolts connecting respective outer flanges of the first and second cases 146, 148. The diaphragm 144 separates the housing 140 into a first chamber 150 and a second chamber 152. The first chamber 150 is defined at least partly by one side of the diaphragm 144 and the diaphragm case 146. The second chamber 152 is defined at least partly by the other side of the diaphragm 144 and the spring case 148.

An exhaust vent 156 is formed in the spring case 148 and extends into the second chamber 152. The exhaust vent 156 includes an orifice 160 that extends from a vent inlet 164 to a vent outlet 168. In the depicted embodiment, the vent outlet 168 comprises a substantially cylindrical and internally threaded opening in the spring case 148. The vent inlet 164 is in fluid communication with the second chamber 152 and the vent outlet 168 is in fluid communication with the surrounding ambient atmosphere, such that the exhaust vent 156 fluidly connects the second chamber 152 to the surrounding ambient atmosphere. In turn, the second chamber 152 can be maintained at a pressure that is approximately equal to the pressure of the surrounding ambient atmosphere.

The linkage includes a lever 188 that has a first end operatively connected to the diaphragm 144 and a second end operatively connected to the valve stem 136. Movement of the diaphragm 144 in response to pressure changes at the outlet 120 causes the linkage to shift the control element 108 in a manner so as to maintain the process fluid pressure within a pre-selected range at the fluid outlet 120. The actuator assembly 112 also includes a control spring 196, a first spring seat 200, and a second spring seat 204. The first spring seat 200 is disposed on top of the diaphragm 144 within the second chamber 152 of the actuator housing 140. The first spring seat 200 receives and supports a first end of the control spring 196. The second spring seat 204, which likewise is disposed within the second chamber 152, receives a second end of the control spring 196 opposite the first end. So arranged, the control spring 196 biases the diaphragm 144 in a direction (a rightward direction in the orientation shown in FIG. 1) against the fluid pressure with a selected force so as to maintain the process fluid pressure within the pre-selected range at the fluid outlet 120. The force exerted by the control spring 196 can be adjusted via the second spring seat 204 or via any other known means, e.g., an adjusting screw. As illustrated in FIG. 1, the actuator assembly 112 may also include components such as, for example, a valve plug and a release spring that are disposed in the exhaust vent 156 and serve to damp the response of the control valve assembly 100.

In other examples, the regulator body 104, the control element 108, the actuator assembly 112, or combinations thereof can vary from what is depicted herein and yet still perform the intended functionality. In some examples, the shape, size, and/or configuration of the fluid inlet 116, the fluid outlet 120, the fluid flow path 124, and/or the orifice 128 can vary from what is depicted in FIG. 1. In some examples, the shape, size, and/or configuration of the actuator housing 140, particularly the first case 146 and the second case 148, can vary from what is depicted in FIG. 1. Moreover, the shape, size, and/or components of the exhaust vent 156 can vary from what is depicted in FIG. 1. For example, the orifice 160 can have a different size and/or shape (e.g., it can be defined by different sized and/or shaped components). While the depicted embodiment shows the pressure at the outlet 120 as the control pressure (i.e., the pressure acting on the diaphragm 144), in an alternate embodiment, the pressure at the inlet 116 may be the control pressure.

As noted briefly above, with the control valve assembly 100 configured as described, the diaphragm-based actuator 112 serves to position the valve plug 132 of the control element 108 relative to the valve seat 126 to satisfy desired process control parameters (e.g., a desired set-point pressure). The spring 196 of the actuator assembly 112 naturally biases the diaphragm 144 rightward relative to the orientation of FIG. 1, which translates into a movement of the control element 108 toward an open position (i.e., with the valve plug 132 positioned away from the valve seat 126). The fluid pressure at the outlet 120 is communicated to the first chamber 150 through the throat 202. An increase in pressure at the outlet 120 is sensed by the diaphragm 144 and ultimately overcomes the force applied by the spring 196, thereby moving the diaphragm 144 in the leftward direction (in the orientation shown in FIG. 1) and moving the lever 188, the valve stem 136 and, in turn, the valve plug 132 toward the closed position. When the fluid pressure at the outlet 120 decreases (e.g., in response to an increase in fluid demand downstream of the control valve assembly 100), the spring 196 overcomes the decreased fluid pressure in the first chamber 150 and again urges the diaphragm 144 in the rightward direction (in the orientation shown in FIG. 1) and, in turn, the lever 188, the valve stem 136, and the valve plug 132 back toward the open position.

As noted above, the orifice 160 of the exhaust vent 156 facilitates the movement of air into and out of the exhaust vent 156 and, thus, the second chamber 152 in an attempt to maintain the pressure inside the second chamber 152 at atmospheric pressure. In arrangements in which the control valve assembly is installed in an indoor location, vent piping would, conventionally, be fluidly coupled to the exhaust vent 156 of the control valve assembly 100. The vent piping would run or connect to an external or ambient environment (e.g., outside, a safe location) away from the control valve assembly 100, and in the event that the diaphragm 144 or some other component of the valve assembly 100 was to fail in a manner that introduced process fluid into the second chamber 152, the vent piping could safely transport or vent the process fluid from within the valve assembly 100 to the external environment. Without this vent piping, the process fluid would, undesirably, be vented into an environment in or at which the control valve assembly 100 is installed.

Such vent piping can, however, be costly and time-consuming to install and maintain and require significant amounts of space once installed. The present disclosure thus discloses a vent limiting device, in the form of the vent limiting device 114, in lieu of external vent piping. The vent limiting device 114 disclosed herein is operably coupled to the exhaust vent 156 and can help to maintain the pressure inside the second chamber 152 at atmospheric pressure but can also limit, if not totally prevent, the flow of process fluid out of the valve assembly 100 via the exhaust vent 156 in the event that the diaphragm 144 or some other component of the valve assembly 100 fails. Indeed, the vent limiting device 114 can, for example, limit the flow of natural gas to less than 2.5 standard cubic feet per hour at pressures between 2 inWC (approximately 0.072 psi) and 10 psi, as the ANSI Z21.80 standard requires when no external vent piping is utilized.

FIGS. 2-8 illustrate the features of the vent limiting device 114 in greater detail. As illustrated, the vent limiting device 114 in this example generally includes a housing 250, a poppet 254 movably disposed in the housing 250 to control fluid flow through the housing 250, and a retaining element 258 arranged to retain the poppet 254 in the housing 250. In other examples, the vent limiting device 114 can include additional, different, or fewer components. For example, the shape and/or size of the housing 250, the poppet 254, and/or the retaining element 258 can vary from what is depicted in FIGS. 2-8.

Figure 2:
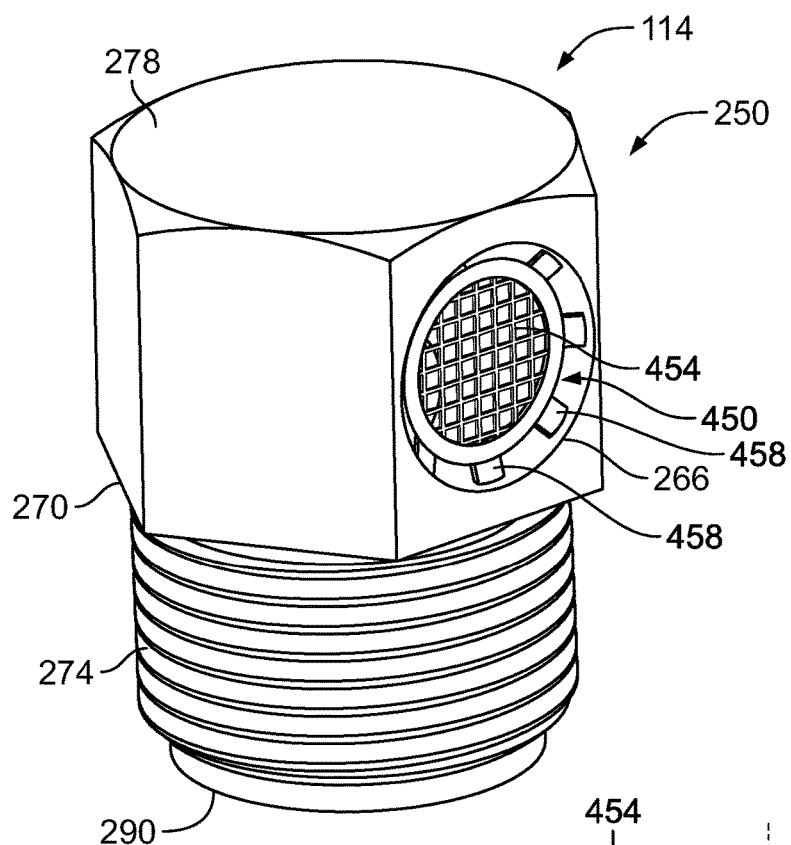
FIG. 2 is a perspective view of the vent limiting device of FIG. 1.
Figure 3:
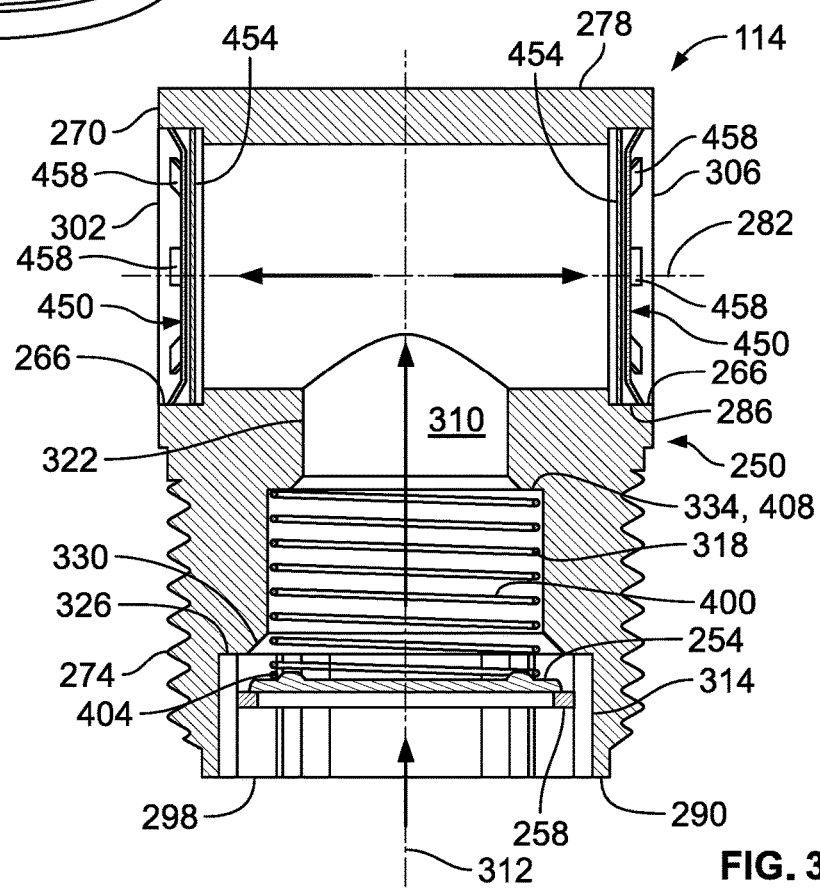
FIG. 3 is a cross-sectional view of FIG. 2.
Figure 4:
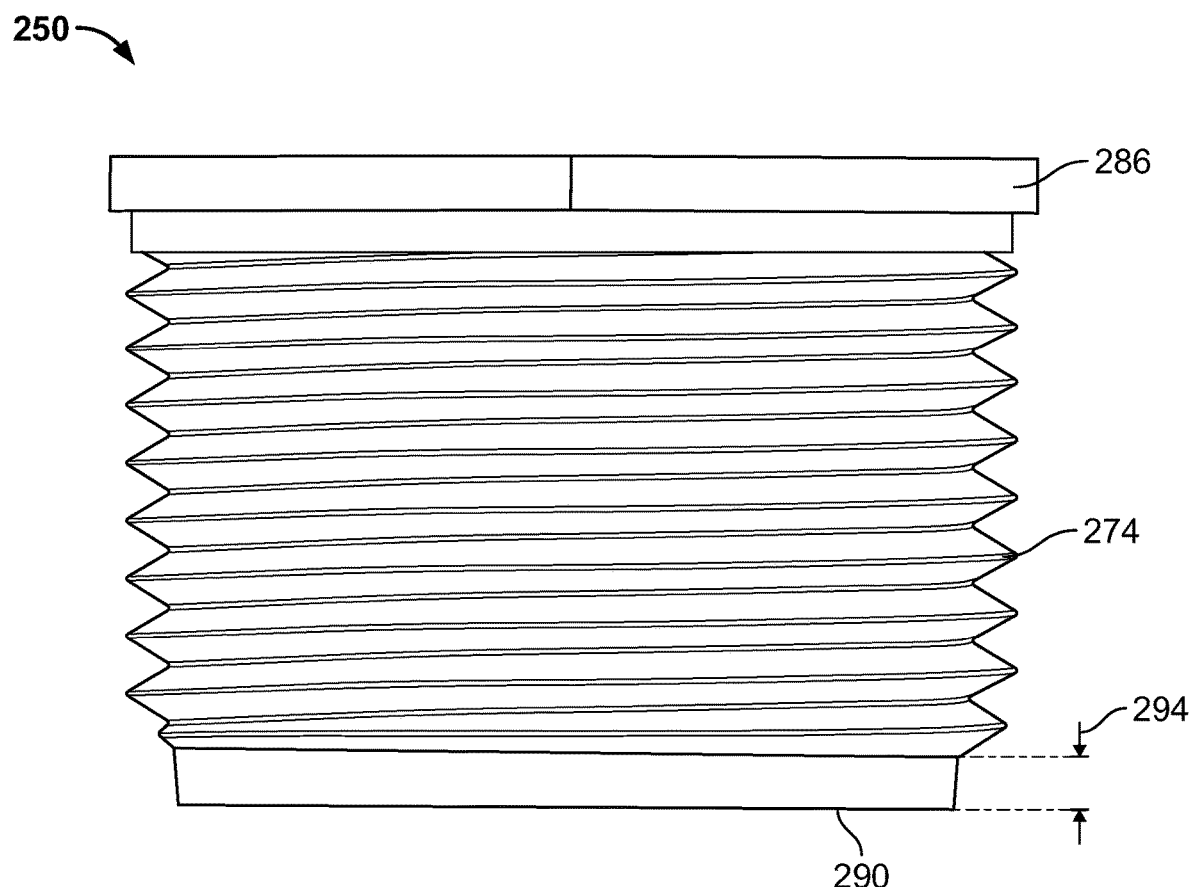
FIG. 4 is a partial, close-up view of the vent limiting device of FIG. 2, showing a portion of a housing of the vent limiting device.

As best illustrated in FIGS. 2 and 3, the housing 250 in this example has a generally hexagonal first portion 270 and a generally cylindrical second portion 274 extending outward (downward in FIGS. 2 and 3) from the first portion 270. The first portion 270 defines a first, or top, end 278 of the housing 250. A vent hole 266 is formed through two opposing faces of the first portion 270, such that the vent hole 266 extends through the first portion 270 along a transverse axis 282 of the housing 250. The first portion 270 transitions to the second portion 274 (and vice-versa) at or via a shoulder 286. The second portion 274, meanwhile, defines a second, or bottom, end 290 of the housing 250. As illustrated in FIGS. 2-4, at least a portion of the second portion 274 is threaded. In this example, only a portion of the second portion 274 is threaded. More specifically, only a portion of the second portion 274 between the shoulder 286 and the second end 290 is threaded, such that there is a gap 294 between the threaded portion and the second end 290 of the housing 250. In other words, the threads do not extend to the second end 290. This gap 294 between the end of the threaded portion and the second end 290 beneficially provides a visual indication to an operator of the vent limiting device 114 as to the proper location for applying thread sealant (not shown, but typically pipe dope, Loctite, Teflon Tape, or the like) to the threaded portion prior to installation of the vent limiting device 114 in the control valve assembly 100. The gap 294 also serves to create a barrier between the end of the threaded portion and the end 290 of the housing 250, which reduces the likelihood that thread sealant that is misapplied or over applied by the operator will enter the housing 250, thereby potentially affecting the functionality of the vent limiting device 114.

As best illustrated in FIG. 3, the housing 250 in this example defines a fluid inlet 298, a first fluid outlet 302, a second fluid outlet 306, and a fluid passageway 310 extending between the fluid inlet 298 and each of the fluid outlets 302, 306. In other examples, the housing 250 may define only one fluid outlet or more than two outlets. The fluid inlet 298 is arranged at the second end 290 of the housing 250 and extends along a longitudinal axis 312. The fluid passageway 310 in this example takes the form of a first cavity 314 in fluid communication with the fluid inlet 298, a second cavity 318 in fluid communication with the first cavity 314, and a third cavity 322 in fluid communication with the second cavity 318 and with the first and second fluid outlets 302, 306. The first cavity 314 has a first diameter and is defined between the second end 290 and a first shoulder 326 of the housing 250. A valve seat 330 is disposed in the fluid passageway 310 between the first shoulder 326 and the second cavity 318. The valve seat 330 in this example defines an angled seating surface that extends (e.g., tapers) between the first shoulder 326 and the second cavity 318. In other examples, however, the valve seat 330 need not define an angled seating surface (e.g., it may instead define a flat seating surface) or may be positioned in a different location within the housing 250. The second cavity 318 has a second diameter that is smaller than the first diameter of the first cavity 314, and extends between the valve seat 330 and a second shoulder 334 of the housing 250. The third cavity 322 has a third diameter that is smaller than the second diameter, and extends between the second shoulder 334 and the first and second fluid outlets 302, 306, which are both defined by the vent hole 266 and are arranged proximate the first end 278 of the housing 250. Thus, at least in this example, the first and second fluid outlets 302, 306 extend in a direction that is perpendicular to the fluid inlet 298.

Figure 5:
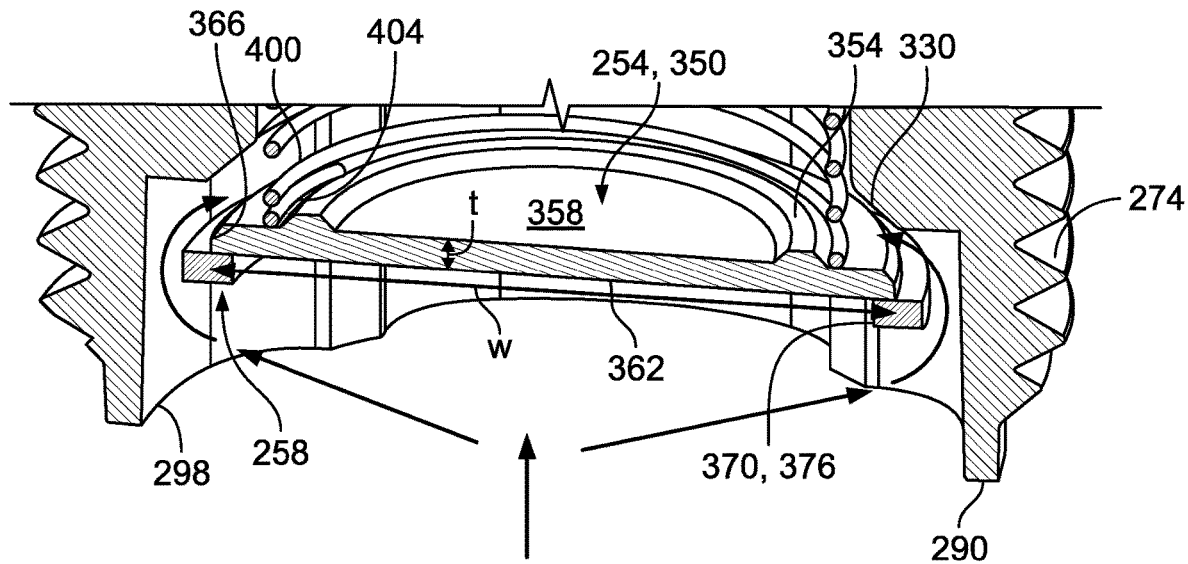
FIG. 5 is a partial, close-up view of the vent limiting device of FIG. 3, showing a poppet and a retaining element arranged to retain the poppet in the housing.

The poppet 254 is generally movably disposed in the housing 250 along the longitudinal axis 312 to control fluid flow through the fluid passageway 310. As best illustrated in FIGS. 3 and 5, the poppet 254 in this example takes the form of a substantially flat, annular disc defined by a flat, annular portion 350 and an annular spring-retention protrusion 354 carried by the annular portion 350. The substantially flat, annular disc in this example preferably has a thickness t of approximately 1.5 mm and a width w of approximately 21.95 mm, such that the width w is greater (in this case approximately 14.63 times greater) than the thickness t. In other examples, however, the thickness t, the width w, and the ratio of w/t can vary. As an example, the thickness t can alternatively be 80%, 90%, 110%, 120%, or some other percentage of the thickness t of the substantially flat, annular disc in this example. The annular portion 350 has a first, or top, side 358, a second, or bottom, side 362, and a perimeter edge 366 that extends between the first and second sides 358, 362. The first and second sides 358, 362 in this example are solid, i.e., they do not include any apertures therethrough. In other examples, however, one or more apertures can extend through the first and second sides 358, 362. In this example, the perimeter edge 366 is, like the valve seat 330, angled, but is oriented at a different angle than the valve seat 330. The annular spring-retention protrusion 354 extends outward (upward in FIGS. 3 and 5) from the first side 358 of the annular portion 350 at a position radially inward of but proximate the perimeter edge 366.

Figure 6:
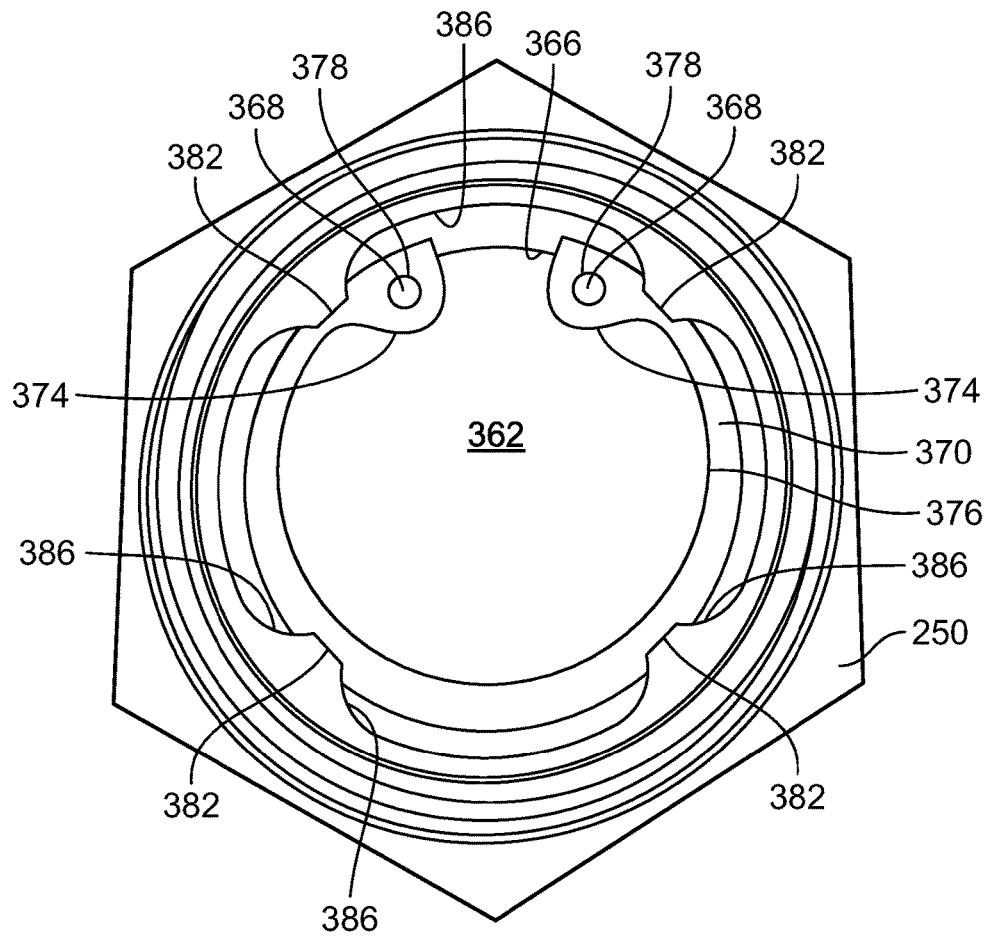
FIG. 6 is a bottom view of the vent limiting device of FIG. 2, showing a plurality of retaining features configured to retain the retaining element in the housing.

With continued reference to FIGS. 3, 5, and 6, the retaining element 258 in this example takes the form of a retaining ring having a thin, substantially circular profile defined by a body 370 and a pair of opposing ends 374 that extend radially inwardly from the body 370. In other embodiments, the retaining element 258 may take the form of an E-clip or may be threaded or press fit into the housing 250. The body 370 defines a central opening 376. Each of the ends 374 has an aperture 378 that is configured to engage with a tool to compress the retaining element 258 for installation in the interior of the housing 250. In turn, the retaining element 258 engages the poppet 254, and, more particularly, the bottom side 362 of the poppet 254. In doing so, the poppet 254 covers the central opening 376 of the retaining element 258, such that the retaining element 258 acts as a stop for the poppet 254 against the force exerted by the biasing element 400 (described below) in the normal position.

As best illustrated in FIG. 6 the housing 250 also includes one or more retaining features arranged to engage the retaining element 258 to retain the retaining element 258 (and, in turn, the poppet 254) in the housing 250. In this example, the housing 250 includes a plurality of retaining features in the form of four projections 382 that extend radially inwardly, into the fluid passageway 310 (and the first cavity 314, in particular), and each engage a corresponding portion of the body 370 of the retaining element 258. The four projections 382 are circumferentially arranged around the fluid passageway 310, thereby defining four grooves 386. Each groove 386 is defined between two adjacent projections 382. When the projections 382 engage the corresponding portions of the body 370, a portion of the body 370 is also received in each of the four grooves 386, but a portion of each of the grooves 386 is also void. This allows fluid to flow around the retaining element 258 and the poppet 254, as will be discussed in greater detail below. In other examples, however, the housing 250 can include a different number of projections 382, the projections 382 can be arranged differently relative to the fluid passageway 310, and/or the housing 250 can include one or more different retaining features.

The vent limiting device 114 also includes a biasing element 400. In this example, the biasing element 400 takes the form of a spring having a first end 404 seated against the poppet 254 and a second end 408 opposite the first end 404 and seated against a spring seat defined by the second shoulder 334 of the housing 250. In particular, the first end 404 of the spring is seated between the annular spring-retention protrusion 354 of the poppet 254 and the perimeter edge 366 of the poppet 254, as illustrated in FIG. 5. Thus, the biasing element in this example is arranged to bias the poppet 254 away from and out of engagement with the valve seat 330, i.e., to an open position, and towards the retaining element 258. In other examples, however, the biasing element 400 may instead take the form of a different type of biasing element and/or the biasing element 400 can be arranged differently.

As discussed above, the vent limiting device 114 is operably coupled to the exhaust vent 156 to help maintain the pressure inside the second chamber 152 at atmospheric pressure and, at the same time, to limit, if not prevent, the flow of process fluid out of the valve assembly 100 in the event that the diaphragm 144 or some other component of the valve assembly 100 fails. In this example, the vent limiting device 114 is coupled to the exhaust vent 156 by threading the second portion 274 of the housing 250 into the internally threaded vent outlet 168, such that the vent limiting device 114 is partially disposed within the exhaust vent 156. In turn, the fluid inlet 298 is in fluid communication with the orifice 160 of the exhaust vent 156 (and, thus, the second chamber 152), and the fluid outlet 302, 306 is in fluid communication with the external atmosphere. In other examples, however, the vent limiting device 114 can be coupled to the exhaust vent 156 so that a portion of the exhaust vent 156 is disposed within the vent limiting device 114 or coupled using means other than threads. As an example, the vent limiting device 114 can be integrally formed with the spring case 148. As another example, the vent limiting device 114 can be press fit or otherwise inserted into the exhaust vent 156.

In any case, when the vent limiting device 114 is operably coupled to the exhaust vent 156 and the valve assembly 100 is in operation, the poppet 254 is movable, responsive to pressure changes at the fluid inlet 298, to control fluid flow through the fluid passageway 310 in a manner that achieves the aforementioned functionality. More particularly, the poppet 254 is movable, responsive to pressure changes at the fluid inlet 298, relative to the valve seat 330 between the fully open position shown in FIG. 7 and the closed position shown in FIG. 8.

Figure 7:
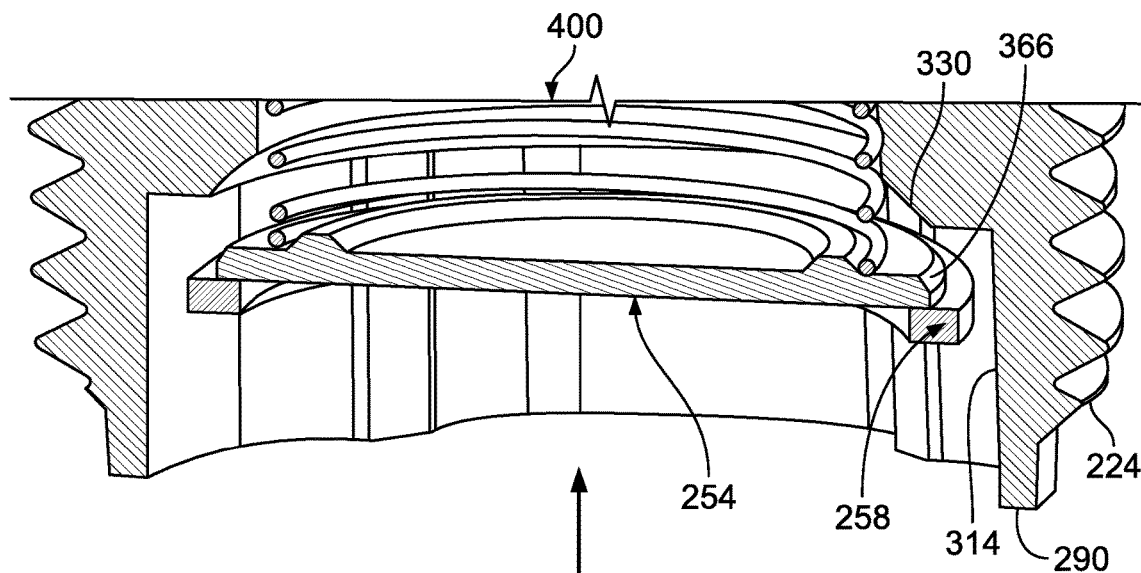
FIG. 7 is similar to FIG. 5, showing the poppet in an open position.
Figure 8:
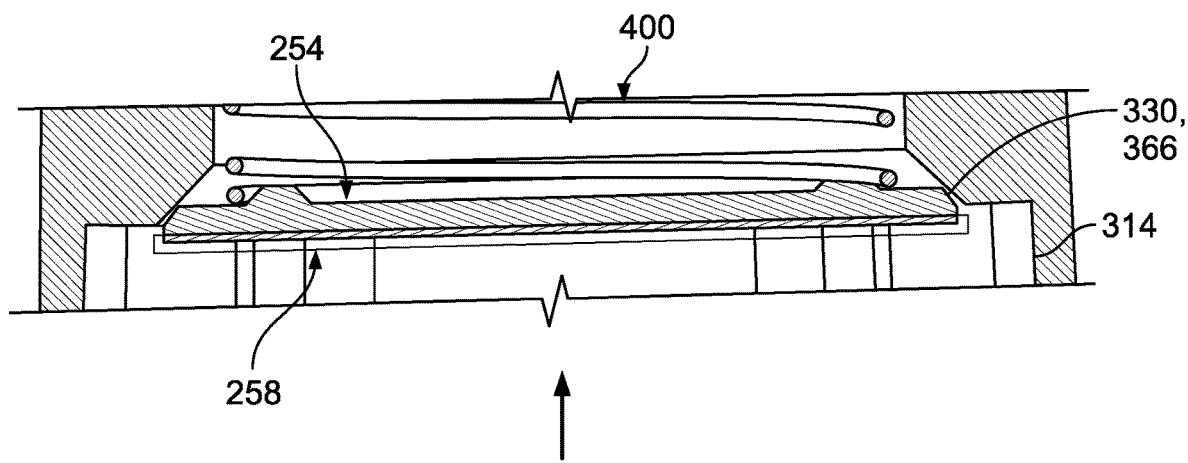
FIG. 8 is similar to FIG. 7, but shows the poppet in a closed position.

When the poppet 254 is in the fully open position shown in FIG. 7, the poppet 254 is spaced from the valve seat 330, such that fluid that has entered the vent limiting device 114 is able to flow through the fluid passageway 310 (in either direction between the inlet 298 and the outlets 302, 306) by flowing around an outer surface of the retaining element 258 and around the perimeter edge 366 of the poppet 254. More specifically, fluid flows through the fluid passageway 310 around the outer surface of the retaining element 258 in the areas defined by the grooves 386 (i.e., in the areas where the retaining element 258 is not engaged by the protrusions 382). In other words, the grooves 386 define a portion of the fluid passageway 310 between the housing 250 and the retaining element 258. Importantly, in this configuration, as the fluid flows through the fluid passageway 310 and, the vent limiting device 114 offers only minimal flow restriction, such that the fluid flowing through the fluid passageway 310 does not create a back pressure on the poppet 254 and fluid is able to flow into and out of the second chamber 152. Conversely, when the poppet 254 is in the closed position shown in FIG. 8, the poppet 254, via the perimeter edge 366, sealingly engages the angled seating surface of the valve seat 330, thereby preventing fluid flow through the fluid passageway 310 (and the vent limiting device 114 more generally). Thus, when the poppet 254 is in the closed position, the vent limiting device 114 substantially, if not completely, prevents fluid from flowing out of the valve assembly 100 via the exhaust vent 156.

When the control valve assembly 100 is working properly, the pressure within the second chamber 152 will be less than a pre-determined pressure value, which in this example corresponds to the biasing force of the biasing element 400. This pre-determined pressure will vary based upon the given application, but may, for example, be equal to 2 inWC (approximately 0.072 psi). So long as the pressure within the second chamber 152 is less than this pre-determined value, the biasing force generated by the biasing element 400 will exceed the force generated on the bottom side 362 of the poppet 254 by the fluid pressure at the fluid inlet 298. Thus, the poppet 254 will be in the fully open position shown in FIG. 7 or in some other open position between the fully open position shown in FIG. 7 and the closed position shown in FIG. 8, with the exact position of the poppet 254 being dependent upon the exact pressure value at the fluid inlet 298. In turn, the vent limiting device 114 allows the control valve assembly 100 to breathe, thereby accommodating movement of the diaphragm 144. However, when the diaphragm 144 or some other component of the control valve assembly 100 fails or is not working properly, the pressure within the second chamber 152 increases. When the pressure within the second chamber 152 rises above the pre-determined pressure value, the biasing force generated by the biasing element 400 will no longer exceed the force generated on the bottom side 362 of the poppet 254 by the fluid pressure at the fluid inlet 298. In other words, the fluid pressure at the fluid inlet 298 will act to drive the poppet 254 to the closed position shown in FIG. 8. In turn, the poppet 254 will prevent process fluid from flowing through the fluid passageway 310 and out of the exhaust vent 156 (and more generally the control valve assembly 100). In this manner, the vent limiting device 114 prevents process fluid from escaping the control valve assembly 100 and being vented to or into the environment in or at which the control valve assembly 100 is installed.

To prevent insects and debris from the external environment from entering the vent limiter 114 (and the control valve assembly 100) via the vent hole 266, the vent limiter 114 also includes at least one barrier disposed in the vent hole 266. In this example, the vent limiter 114 includes a pair of barriers 450 disposed at each end of the vent hole 266, with one barrier 450 disposed in the first fluid outlet 302 and one barrier 450 disposed in the second fluid outlet 306, as illustrated in FIG. 2. Each of the barriers 450 in this example takes the form of a generally thin mesh screen 454, such as a wire mesh screen (e.g., a stainless steel screen, a copper screen, a brass screen, a bronze screen, aluminum screen, etc.) or some other type of screen, removably disposed in a respective one of the fluid outlets 302, 306. The mesh screens 454 are removably disposed in the fluid outlets 302, 306, respectively, via a plurality of curved retention fingers 458 carried by each of the mesh screens 454. Installing the barriers 450 in the first and second fluid outlets 302, 306, respectively, generally involves compressing the fingers 458 and then disposing the mesh screens 454 in the respective fluid outlet 302, 306 such that the mesh screens 454 are disposed entirely within the housing 250. In other examples, the vent limiter 114 may include one barrier 450 or more than two barriers 450, the barriers 450 can be integrally formed with the housing 250, and/or the barriers 450 can have a different shape, size, and/or be installed using different components.

Finally, it will be appreciated that the vent limiter 114, and the components thereof, may be manufactured using a standard manufacturing technique or an additive manufacturing technique (e.g., 3-D printing, selective laser sintering, etc.). As an example, when the vent limiter 114 is manufactured using an additive manufacturing technique, the second end 290 of the housing 250 may be formed so as to extend radially inwardly without changing the grooves 386, thereby offering better sealant and debris protection. Additionally, it will be appreciated that the components of the vent limiter 114 can be made of the same material (e.g., a metallic material such as stainless steel, brass, aluminum) or can be made of any number of different metallic and non-metallic materials. In one example, the housing 250 can be made of brass and the poppet 254 can be made of aluminum. Further, in examples in which the housing 250 and the poppet 254 are each made of a metallic material, it will be appreciated that a metal to metal seal will be effectuated when the poppet 254 sealingly engages the valve seat 330.

Preferred embodiments of this invention are described herein, including the best mode or modes known to the inventors for carrying out the invention. Although numerous examples are shown and described herein, those of skill in the art will readily understand that details of the various embodiments need not be mutually exclusive. Instead, those of skill in the art upon reading the teachings herein should be able to combine one or more features of one embodiment with one or more features of the remaining embodiments. Further, it also should be understood that the illustrated embodiments are exemplary only, and should not be taken as limiting the scope of the invention. The use of any and all examples, or exemplary language (e.g., "such as") provided herein, is intended merely to better illuminate the aspects of the exemplary embodiment or embodiments of the invention, and do not pose a limitation on the scope of the invention. No language in the specification should be construed as indicating any non-claimed element as essential to the practice of the invention.

The invention claimed is:

1. A vent limiting device adapted to be operably coupled to an exhaust vent of a fluid regulator, the vent limiting device comprising:
   a housing having a fluid inlet, a fluid outlet, and a fluid passageway extending between the fluid inlet and the fluid outlet, the housing including a seat disposed along the fluid passageway;
   a poppet disposed in the housing and movable relative to the seat, responsive to pressure at the fluid inlet, to control fluid flow through the fluid passageway, the poppet movable between an open position, in which the poppet is spaced from the seat, thereby allowing fluid flow through the fluid passageway, and a closed position, in which the poppet sealingly engages the seat, thereby substantially preventing fluid flow through the fluid passageway;
   a retaining element arranged to retain the poppet in the housing, wherein the housing includes a plurality of projections that engage the retaining element to retain the retaining element in the housing and that define a plurality of grooves that form a portion of the fluid passageway between the housing and the retaining element; and
   a plurality of threads formed on an external surface of the housing, the plurality of threads spaced between a first end of the housing and a second end of the housing, wherein the plurality of threads do not extend to either the first or second end of the housing,
   wherein the retaining element comprises a retaining ring having a central opening, and wherein the poppet covers the central opening in the open position.

2. The vent limiting device of claim 1, wherein the poppet is seated against the retaining element.

3. The vent limiting device of claim 1, wherein the housing is made of metal and the poppet is made of metal, thereby creating a metal-to-metal seal when the poppet is in the closed position.

4. The vent limiting device of claim 1, further comprising a spring having one end seated against the poppet and another end seated against a spring seat defined by the housing, the spring configured to bias the poppet to the open position.

5. The vent limiting device of claim 1, wherein the plurality of projections extend radially inwardly.

6. The vent limiting device of claim 1, wherein the fluid outlet is defined by a vent hole formed in the housing, further comprising one or more barriers disposed in the vent hole.

7. The vent limiting device of claim 6, wherein the one or more barriers are removably disposed in the vent hole.

8. A vent limiting device adapted to be operably coupled to an exhaust vent of a fluid regulator, the vent limiting device comprising:
   a housing having a fluid inlet, a fluid outlet, and a fluid passageway extending between the fluid inlet and the fluid outlet, the housing including a seat disposed along the fluid passageway;
   a poppet disposed in the housing and movable relative to the seat, responsive to pressure at the fluid inlet, to control fluid flow through the fluid passageway, the poppet comprising a disc and movable between an open position, in which the poppet is spaced from the seat, thereby allowing fluid flow through the fluid passageway, and a closed position, in which the poppet sealingly engages the seat, thereby substantially preventing fluid flow through the fluid passageway;
   a retaining element arranged to retain the poppet in the housing, wherein the retaining element comprises a retaining ring having a central opening, and wherein the poppet covers the central opening in the open position; and
   a spring having one end seated against the poppet and another end seated against a spring seat that is defined by the housing and spaced from the retaining element, the spring configured to bias the poppet to the open position.

9. The vent limiting device of claim 8, wherein the retaining element is disposed entirely within the housing.

10. The vent limiting device of claim 8, wherein the housing includes a plurality of projections that engage the retaining element to retain the retaining element in the housing.

11. The vent limiting device of claim 8, wherein the poppet is seated against the retaining element.

12. The vent limiting device of claim 8, wherein the housing is made of metal and the poppet is made of metal, thereby creating a metal-to-metal seal when the poppet is in the closed position.

13. The vent limiting device of claim 8, wherein the housing further includes one or more grooves, and wherein the one or more grooves define a portion of the fluid passageway between the housing and the retaining element.

14. The vent limiting device of claim 8, wherein the fluid outlet is defined by a vent hole formed in the housing, further comprising one or more barriers removably disposed in the vent hole.

15. The vent limiting device of claim 8, further comprising a plurality of threads formed on an external surface of the housing, the plurality of threads spaced between a first end of the housing and a second end of the housing, wherein the plurality of threads do not extend to either the first or second end of the housing.

16. A fluid regulator, comprising:
   a regulator body defining a regulator fluid inlet, a regulator fluid outlet, and a regulator flow passageway extending therebetween;
   a control element configured to control a fluid flow through the regulator body;
   an actuator operatively coupled to the control element and configured to control a position of the control element, the actuator comprising:
   an actuator housing;
   a diaphragm disposed within the actuator housing and movable within the actuator housing in response to pressure at the regulator fluid inlet or the regulator fluid outlet;
   a first chamber defined adjacent a first side of the diaphragm;
   a second chamber defined adjacent a second side of the diaphragm; and an exhaust vent formed in the actuator housing to fluidly couple the second chamber to the atmosphere; and a vent limiting device coupled to the exhaust vent, the vent limiting device comprising:
- a housing having a housing fluid inlet, a housing fluid outlet, and a fluid passageway extending between the housing fluid inlet and the housing fluid outlet, the housing including a seat disposed along the fluid passageway;
- a poppet disposed in the housing and movable relative to the seat, responsive to pressure at the fluid inlet, to control fluid flow through the fluid passageway, the poppet movable between an open position, in which the poppet is spaced from the seat, thereby allowing fluid flow through the fluid passageway, and a closed position, in which the poppet sealingly engages the seat, thereby substantially preventing fluid flow through the fluid passageway;
- a retaining element arranged to retain the poppet in the housing, wherein the housing includes one or more retaining features that engage the retaining element to retain the retaining element in the housing and that define a portion of the fluid passageway between the housing and the retaining element; and
- a spring configured to bias the poppet to the open position, wherein the retaining element comprises a retaining ring having a central opening, and wherein the poppet covers the central opening in the open position.

17. The vent limiting device of claim 1, wherein the fluid inlet extends along a longitudinal axis of the housing and the fluid outlet extends along an axis that is perpendicular to the longitudinal axis.

18. The fluid regulator of claim 16, wherein the spring has one end seated against the poppet and another end seated against a spring seat defined by the housing, the spring seat spaced from the retaining element.

19. The vent limiting device of claim 1, wherein the plurality of projections define a flow path between an outer diameter of the retaining element and the plurality of grooves when the poppet is in the open position.

20. The fluid regulator of claim 16, wherein the one or more retaining features define a flow path between an outer diameter of the retaining element and one or more grooves defined between the one or more retaining features when the poppet is in the open position.

* * * * *

UNITED STATES PATENT AND TRADEMARK OFFICE
CERTIFICATE OF CORRECTION

PATENT NO. : 10,823,206 B2
APPLICATION NO. : 16/050901
DATED : November 3, 2020
INVENTOR(S) : Bret M. Kirchner et al.

Page 1 of 1

It is certified that error appears in the above-identified patent and that said Letters Patent is hereby corrected as shown below:

On the Title Page

At Page 3, Column 2, item (56), Line 10, "VLimiter®" should be -- vLimiter® --.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*